(12) United States Patent
Goto et al.

(10) Patent No.: US 11,041,818 B2
(45) Date of Patent: Jun. 22, 2021

(54) DIMENSIONAL X-RAY COMPUTED TOMOGRAPHY SYSTEM AND CT RECONSTRUCTION METHOD USING SAME

(71) Applicant: MITUTOYO CORPORATION, Kanagawa (JP)

(72) Inventors: Yusuke Goto, Tochigi (JP); Hidemitsu Asano, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/661,206

(22) Filed: Oct. 23, 2019

(65) Prior Publication Data
US 2020/0141884 A1 May 7, 2020

(30) Foreign Application Priority Data

Nov. 1, 2018 (JP) .............................. JP2018-206924

(51) Int. Cl.
*G01N 23/046* (2018.01)
(52) U.S. Cl.
CPC ..... *G01N 23/046* (2013.01); *G01N 2223/401* (2013.01); *G01N 2223/419* (2013.01)
(58) Field of Classification Search
CPC ........... G01N 23/046; G01N 2223/401; G01N 2223/419; G01N 2223/303
See application file for complete search history.

(56) References Cited

U.S. PATENT DOCUMENTS

| 2003/0043964 | A1* | 3/2003 | Sorenson | G01N 23/04 378/58 |
| 2005/0140955 | A1* | 6/2005 | Butler | G03B 27/72 355/69 |
| 2010/0276605 | A1* | 11/2010 | Olsen | G01T 1/2928 250/370.09 |
| 2018/0092613 | A1* | 4/2018 | Ancar | A61B 6/487 |

FOREIGN PATENT DOCUMENTS

| JP | 2002-71345 | 3/2002 |
| JP | 2004-12407 | 1/2004 |

* cited by examiner

*Primary Examiner* — David P Porta
*Assistant Examiner* — Mamadou Faye
(74) *Attorney, Agent, or Firm* — Greenblum & Bernstein, P.L.C.

(57) ABSTRACT

A dimensional X-ray computed tomography system configured to obtain projection images by irradiating an object to be measured disposed between an X-ray source and an X-ray detector with X-rays for CT scan, and generate a three-dimensional image of the object to be measured by performing CT reconstruction on the projection images, includes a fixed table on which the object to be measured is placed, and a movable X-ray source and a movable X-ray detector that are capable of moving around the fixed table with the fixed table therebetween.

10 Claims, 7 Drawing Sheets

DIMENSIONAL X-RAY COMPUTED TOMOGRAPHY SYSTEM AND CT RECONSTRUCTION METHOD USING SAME

CROSS-REFERENCE TO RELATED APPLICATION

The disclosure of Japanese Patent Application No. 2018-206924 filed on Nov. 1, 2018 including specifications, drawings and claims is incorporated herein by reference in its entirety.

TECHNICAL FIELD

The present invention relates to a dimensional X-ray computed tomography system intended for industrial products, and a CT reconstruction method using the same. In particular, the present invention relates to a dimensional X-ray computed tomography system that can perform an X-ray CT inspection and measurement on an object to be measured, such as a large-sized part and a building, that is unable to be placed on a rotating table used in a typical dimensional X-ray computed tomography system, and a CT reconstruction method using the same.

BACKGROUND ART

Dimensional X-ray computed tomography system such as those described in Japanese Patent Application Laid-Open Nos. 2002-71345 and 2004-12407 have been conventionally used to observe and inspect voids in casting parts, welding defects in welded parts, and defects in electronic parts, which are difficult to identify from external appearance. The prevalence of 3D printers in recent years is boosting demand for 3D dimension measurement inside workpieces and precision enhancement thereof. To address such a demand, there are developed dimensional X-ray computed tomography system taking into account length traceability. A variety of inventive contrivances inspired by and following such a trend are also being made to meet the demand for dimension measurement with higher precision.

FIG. 1 (plan view) and FIG. 2 (side view) show a configuration example of a conventional dimensional X-ray computed tomography system. The dimensional X-ray computed tomography system 1 includes an X-ray source 12, an X-ray detector 14, a rotating table 16, a scanning mechanism 18, and an arithmetic control unit (not shown) as main components. The X-ray source 12 is configured to emit X-rays, and examples thereof may include an X-ray tube. The X-ray detector 14 detects an X-ray beam 13 that is emitted from the X-ray source 12 and transmitted through the periphery and interior of a work 10 that is an object to be measured, and renders a projection of the work 10 into a projection image. Examples of the X-ray detector 14 may include a flat panel display. The rotating table 16 is located between the X-ray source 12 and the X-ray detector 14, and bears the work 10. The scanning mechanism 18 moves the rotating table 16 to a given position in a measurement space area.

In FIG. 1, the horizontal direction from the X-ray source 12 toward the X-ray detector 14 is referred to as an X-axis. The direction perpendicular to the X-axis within the plane of the diagram is referred to as a Y-axis. The direction perpendicular to the XY plane is referred to as a Z-axis.

The rotating table 16 can be moved by the scanning mechanism 18 in the X-, Y-, and Z-axis directions, with the work 10 placed thereon. The rotating table 16 can rotate the work 10 around a θ-axis. By such adjustments, the position and magnification of the projection image of the work 10 obtained by the X-ray detector 14 can be adjusted.

To obtain a three-dimensional image or volume data (CT image) of the work 10, which is the ultimate goal of the dimensional X-ray computed tomography system 1, a CT scan is performed on the work 10.

As shown in FIG. 3, a CT scan includes two processes, namely, acquisition of projection images of the work 10 and CT reconstruction. In the projection image acquisition process, the rotating table 16 bearing the work 10 is continuously rotated at a constant speed or intermittently rotated in constant step widths during X-ray irradiation, whereby projection images of the work 10 in all directions around (constant intervals) are obtained. The volume data of the work 10 is obtained by performing CT reconstruction on the obtained projection images in all directions around (constant intervals) by using a CT reconstruction algorithm such as back projection and iterative reconstruction.

The obtained volume data can be used for various measurements such as dimension measurement and defect analysis.

SUMMARY OF INVENTION

Technical Problem

To obtain a high-quality CT image by using the foregoing typical dimensional X-ray computed tomography system 1, a geometric positional relationship between the focal point of the X-ray source 12, the X-ray detector 14, and the rotation axis of the rotating table 16 needs to be found out and maintained with high precision. The devices are therefore fixed onto a stable structure. There has thus been a problem that an object to be measured unable to be placed on the rotating table 16, such as a large-sized part and a building, cannot be measured.

The present invention has been made in order to solve the above-described problem, and an object thereof is to enable an X-ray CT inspection and measurement of an object to be measured unable to be placed on a rotating table, such a large-sized part and a building.

Solution to Problem

The present invention solves the foregoing problem by providing a dimensional X-ray computed tomography system comprising an X-ray source and an X-ray detector, and a fixed table, the dimensional X-ray computed tomography system being configured to obtain projection images by irradiating an object to be measured disposed between the X-ray source and the X-ray detector with X-rays for CT scan, and generate a three-dimensional image of the object to be measured by performing CT reconstruction on the projection images, wherein the object to be measured is placed on the fixed table, and the X-ray source and the X-ray detector are a movable X-ray source and a movable X-ray detector that are capable of moving around the fixed table with the fixed table therebetween, respectively.

The dimensional X-ray computed tomography system may further include: a reference frame that includes a material and structure less susceptible to an environmental variation; a sensor that is disposed on the reference frame and configured to sequentially detect positions and orientations of the movable X-ray source and the movable X-ray detector during the CT scan; and a reconstruction unit configured to use the detected positions as parameters of the CT reconstruction.

The reference frame may be a metrology frame of square shape.

The reference frame may be disposed where the X-ray source is, and a corner cube disposed on the X-ray detector may be detected by a laser interferometer disposed on the reference frame.

The laser interferometer may be configured to include a light source unit, a light guide fiber, and a laser interferometer emission unit disposed on the reference frame.

A rotary type eccentricity measurement device may be disposed on the fixed table, and a sensor configured to detect a position of the rotary type eccentricity measurement device may be disposed on the reference frame.

The sensor for the rotary type eccentricity measurement device may be a displacement gauge that is disposed around a reference surface on an outer periphery of the fixed table and has a sensitivity in radial and axial directions.

The sensor may be a laser tracker configured to detect a cat eye reflector disposed on a fixing jig on the fixed table.

The X-ray source and/or the X-ray detector may be mounted on a vehicle that runs on the ground and/or a flying object that flies in the air.

The X-ray source and/or the X-ray detector may be configured to be manually moved.

The present invention also provides a CT reconstruction method using a dimensional X-ray computed tomography system, the CT reconstruction method including the steps of:

calibrating a geometric positional relationship between a focal point of an X-ray source, an X-ray detector, and a fixed table of the dimensional X-ray computed tomography system, and then storing the calibrated geometric positional relationship as an initial calibration value;

obtaining a displacement value of a displacement gauge that is a sensor on a metrology frame and a displacement value of a rotary type eccentricity measurement device, and storing the displacement values as initial displacement values;

placing a work on the fixed table, and then irradiating the work with an X-ray beam for CT scan to obtain a plurality of projection images;

obtaining, meanwhile, displacement values of the sensor on the metrology frame during acquisition of the respective projection images; and inputting the initial calibration value, the initial displacement values, and the displacement values of the sensor during the acquisition of the projection images as parameters of CT reconstruction processing, and performing the CT reconstruction processing on the obtained projection images by using the displacement values of the sensor during the acquisition of the projection images to generate volume data.

Advantageous Effects of Invention

According to the present invention, an X-ray CT inspection and measurement can be performed on an object to be measured unable to be placed on a rotating table, such as a large-sized part and a building. High-quality volume data can be generated by sequentially measuring the positional relationship of the X-ray source and the X-ray detector and inputting the amount of change thereof as a CT reconstruction parameter.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DESCRIPTION OF EMBODIMENTS

Embodiments of the present invention will be described in detail below with reference to the drawings. The present invention is not limited by the following description of the embodiments and examples. The components of the embodiments and examples described below include what are easily conceivable by those skilled in the art, what are substantially the same, and what fall within a so-called range of equivalence. The components disclosed in the following embodiments and examples may be combined as appropriate or selectively used as appropriate.

Figure 1:
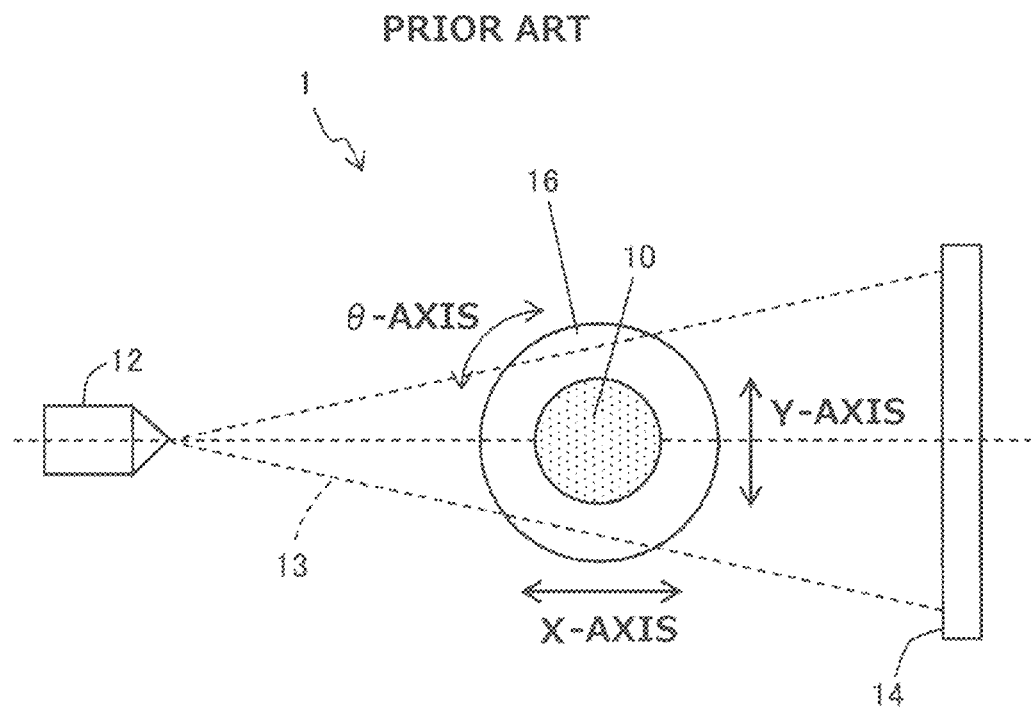
FIG. 1 is a plan view showing a configuration of essential parts of a conventional dimensional X-ray computed tomography system.
Figure 2:
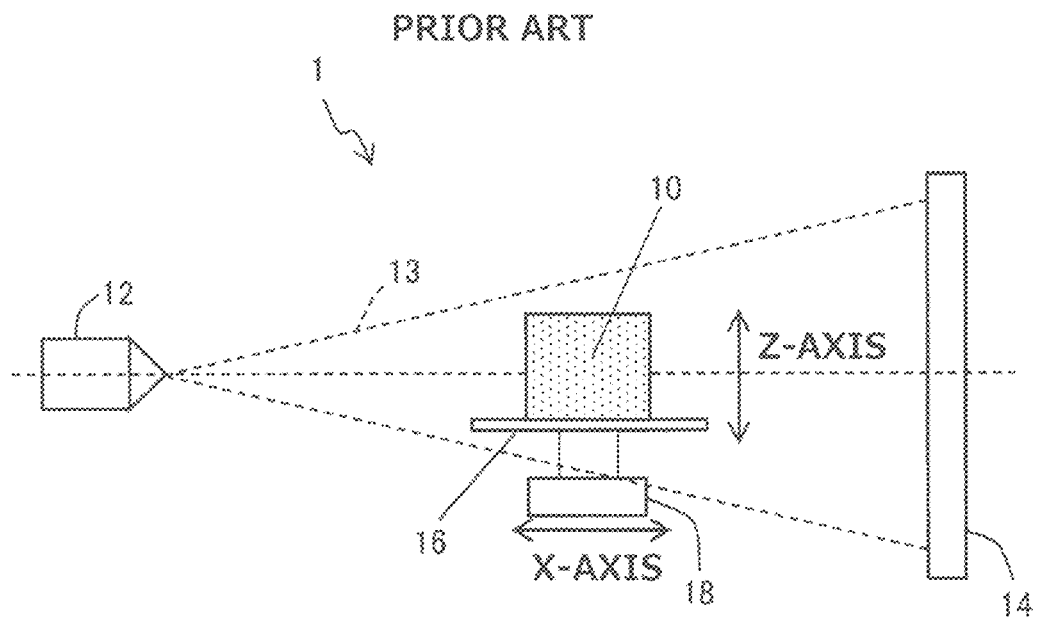
FIG. 2 is a side view of the same.
Figure 3:
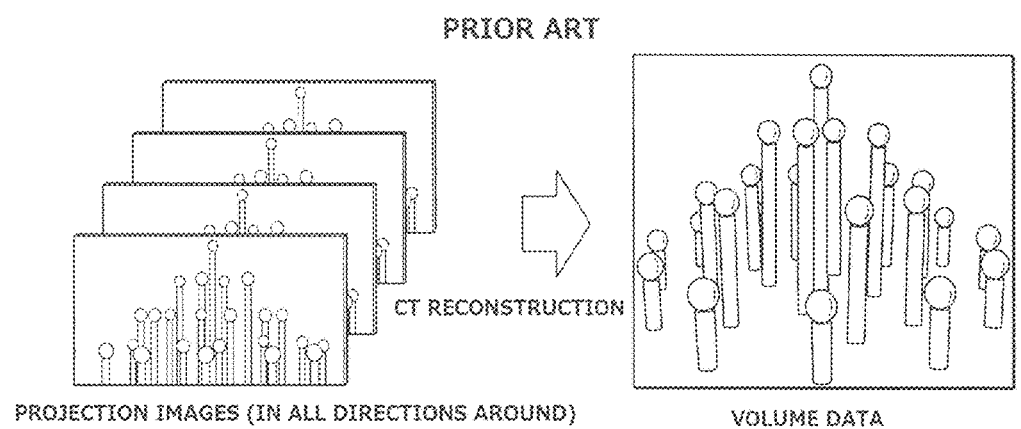
FIG. 3 is a diagram outlining CT reconstruction of the same.
Figure 4:
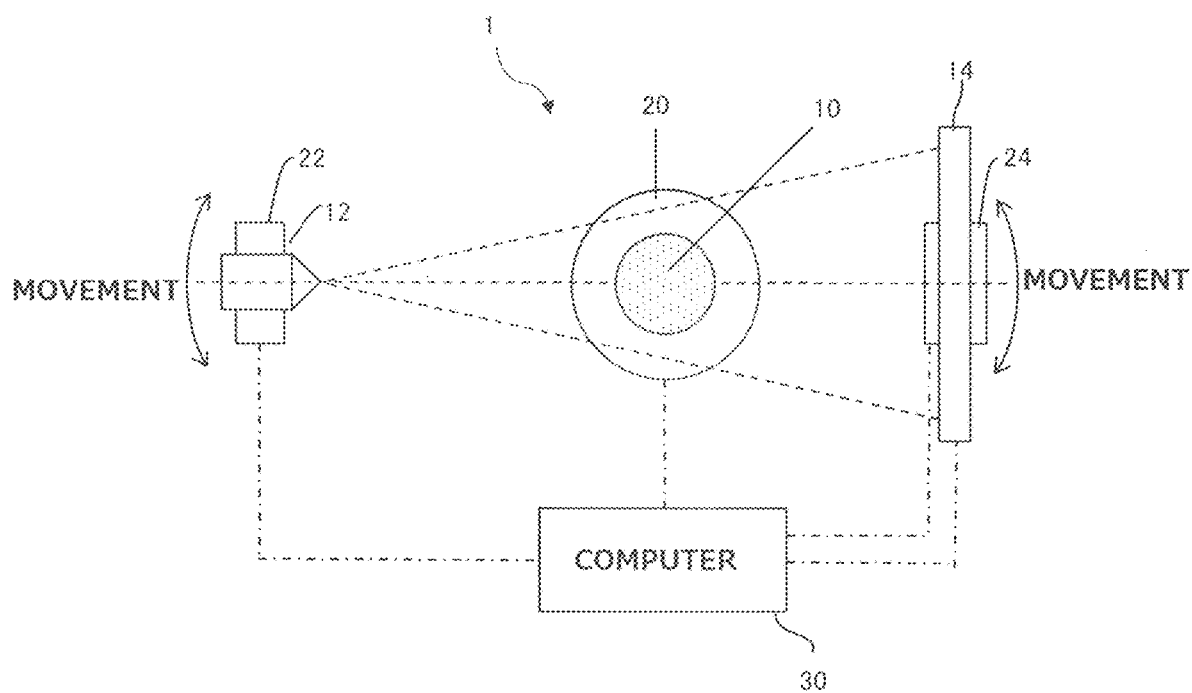
FIG. 4 is a plan view showing a basic configuration according to the present invention.

FIG. 4 shows a basic configuration of a dimensional X-ray computed tomography system 1 according to the present invention. The dimensional X-ray computed tomography system 1 includes a fixed table 20 on which an object to be measured is placed. The dimensional X-ray computed tomography system 1 includes moving mechanisms 22 and 24, for example, so that an X-ray source 12 and an X-ray detector 14 can be independently moved (in a self-propelled manner). In FIG. 4, the reference numeral 30 represents a computer.

The moving mechanisms 22 and 24 of the X-ray source 12 and the X-ray detector 14 may be of ground traveling type using a vehicle running on the ground, such as a four-wheel automobile. The moving mechanisms 22 and 24 may be of aerial flight type using a flying object flying in the air, such as a drone. The moving mechanisms may be omitted, and for example, an X-ray source and an X-ray detector that stand on a tripod etc., like a projector and a screen, may be manually moved.

Depending on the data needed, the X-ray source 12 and the X-ray detector 14 do not necessarily make a turn around a work 10.

Figure 5:
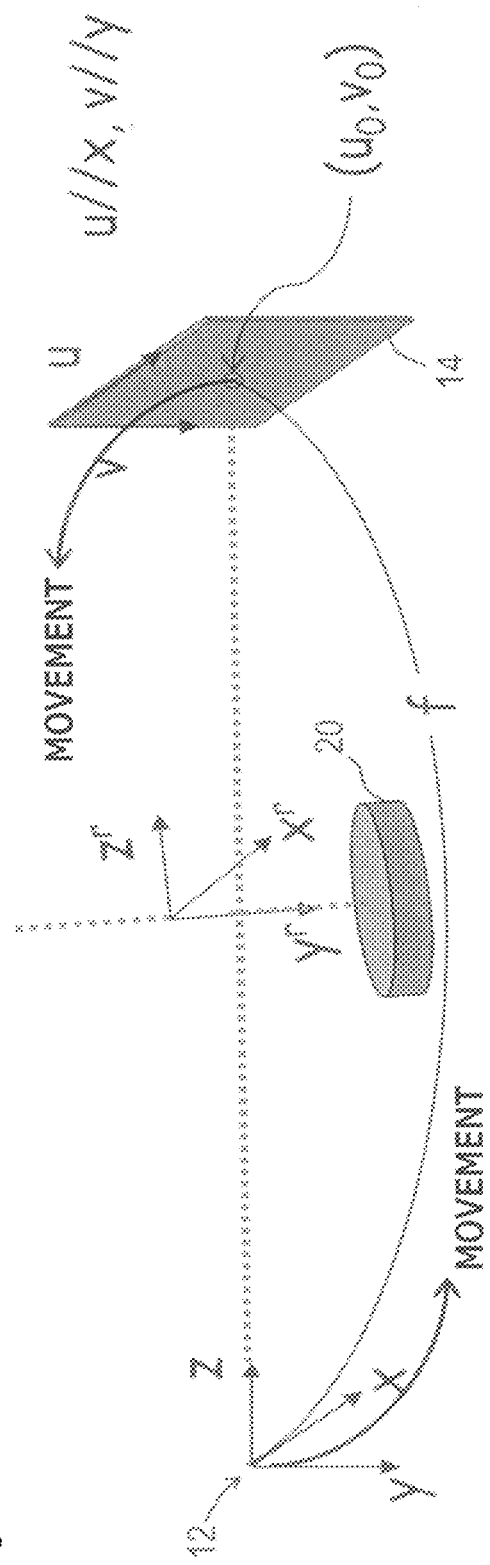
FIG. 5 is a diagram showing a geometric model according to the present invention.

FIG. 5 shows a geometric model of the dimensional X-ray computed tomography system 1 according to the present invention. The geometric model includes a mechanism that rotates the X-ray source 12 and the X-ray detector 14 relative to the fixed table 20 on which the work 10 is placed.

Parameters that vary during a CT scan include ones related to a relative orientation of the fixed table 20 and ones related to the X-ray detector (camera model) 14. The parameters related to the relative orientation of the fixed table 20 include three rotation parameters and three translation parameters. The parameters related to the X-ray detector 14 include two focal length f parameters, a skew parameter, and two center position parameters. In the present invention, changes in the parameters during a CT scan are constantly checked to achieve high-precision X-ray CT.

Figure 6:
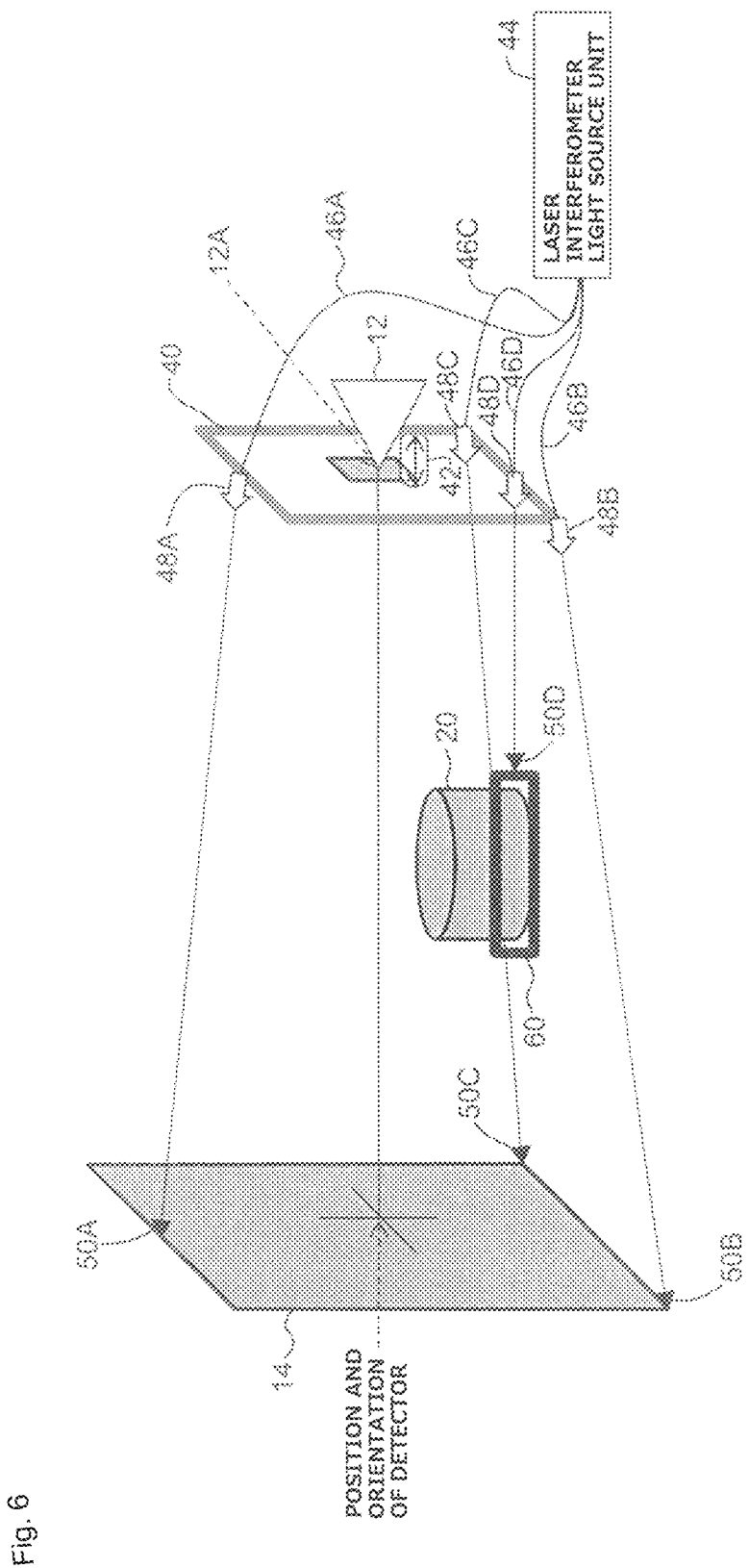
FIG. 6 is a perspective view showing a first embodiment of the present invention.

FIG. 6 shows a first embodiment of the present invention.

In the present embodiment, a metrology frame 40, a reference frame less susceptible to environmental variations and having a square shape, for example, is disposed where the X-ray source 12 is for reference purposes.

A displacement gauge 42 is disposed on the metrology frame 40 to detect a displacement of a target 12A of the X-ray source 12 in the X-axis direction. Three corner cubes 50A, 50B, and 50C disposed on the X-ray detector 14 are detected by using, for example, three laser interferometer emission units 48A, 48B, and 48C disposed on the metrology frame 40, respectively.

A laser interferometer includes a light source unit 44, light guide fibers 46A, 46B, and 46C, and the laser interferometer emission units 48A, 48B, and 48C attached to the metrology frame 40.

The positions and orientations of the X-ray source 12 and the X-ray detector 14 are detected by using the foregoing components.

A rotary type eccentricity measurement device 60 to which a corner cube 50D is attached is further disposed under the fixed table 20, and the position of the fixed table 20 is detected by using laser light emitted from a laser interferometer 48D disposed on the metrology frame 40. The eccentricity of the fixed table 20 is also detected with reference to the rotary type eccentricity measurement device 60.

Figure 7:
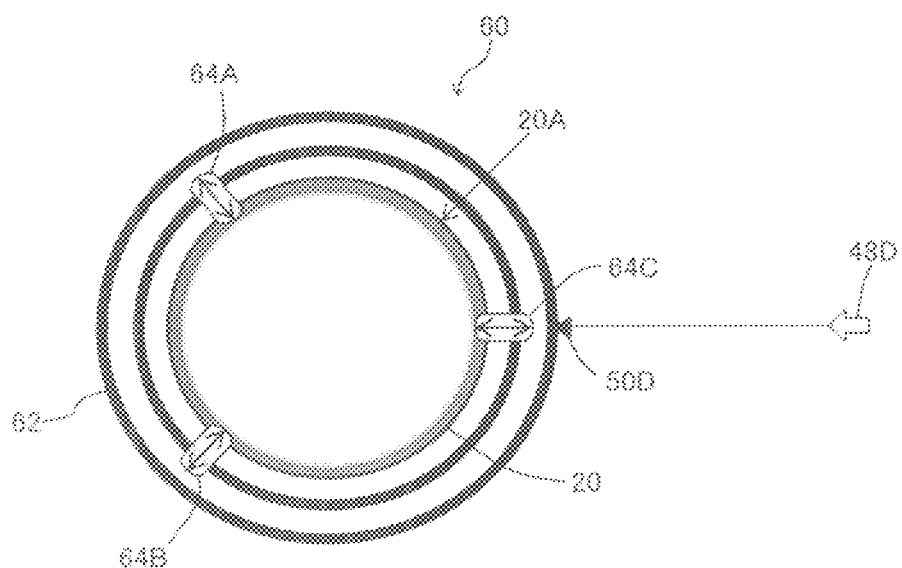
FIG. 7 is a plan view showing a rotary type eccentricity measurement device used in the first embodiment.
Figure 8:
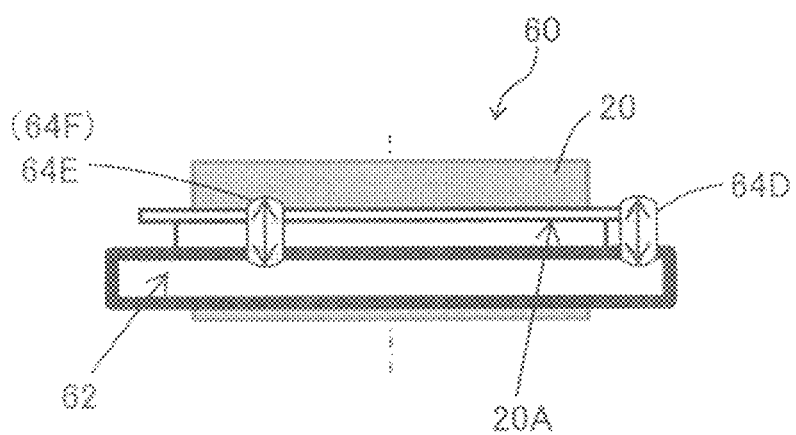
FIG. 8 is a side view of the same.

As shown in FIG. 7 (plan view) and FIG. 8 (side view), the rotary type eccentricity measurement device 60 includes a rotary type eccentricity measurement frame 62, displacement gauges 64A, 64B, 64C, 64D, and 64E, and a not-shown displacement gauge 64F. The rotary type eccentricity measurement frame 62 is disposed around a reference surface 20A (desirably having a good roundness) provided on the outer periphery of the fixed table 20. The displacement gauges 64A to 64F have sensitivity in radial (FIG. 7) and axial (FIG. 8) directions, and are disposed on the rotary type eccentricity measurement frame 62, one or more in each direction, to measure radial and axial displacements of the fixed table 20 with respect to the rotary type eccentricity measurement frame 62. The rotary type eccentricity measurement frame 62 rotates so that the corner cube 50D faces toward the metrology frame 40.

The distance from the metrology frame 40 to the rotary type eccentricity measurement device 60 is measured by detecting the corner cube 50D disposed on the rotary type eccentricity measurement device 60 with the laser light emitted from the laser interferometer emission unit 48D disposed on the metrology frame 40. In FIG. 6, the reference numeral 46D represents a light guide fiber.

Displacements of the target 12A in the Y- and Z-axis directions can be detected by adding displacement gauges.

Position data and orientation data varying during a CT scan, detected by the laser interferometer, the displacement gauge 42, the rotary type eccentricity measurement device 60 and the like, can be used during CT reconstruction processing, whereby the effect of variations can be suppressed.

Figure 9:
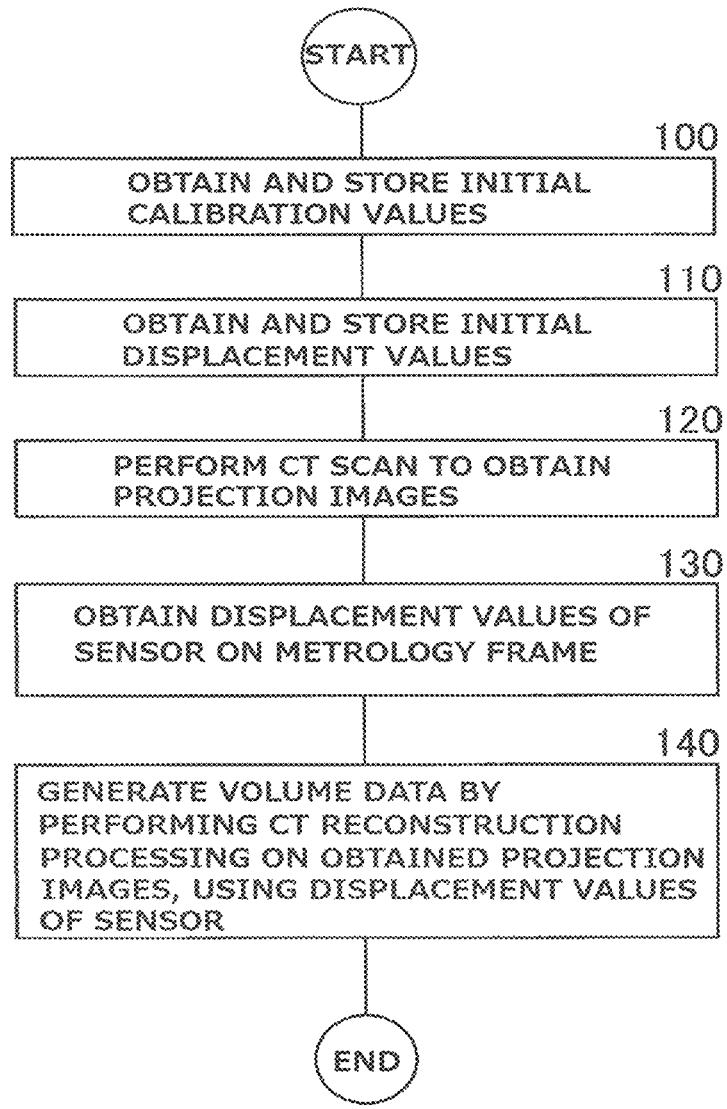
FIG. 9 is a flowchart showing an example of a processing procedure according to the present invention.

Specifically, as shown in FIG. 9, in step 100, a geometric positional relationship between the focal point of the X-ray source 12, the X-ray detector 14, and the fixed table 20 of the dimensional X-ray computed tomography system 1 is initially calibrated. The calibrated geometric positional relationship is then stored as an initial calibration value.

At the same time, in step 110, a displacement value of the displacement gauge 42 that is a sensor on the metrology frame 40 and displacement values of the rotary type eccentricity measurement device 60 are obtained and stored as initial displacement values.

In step 120, the work 10 is placed on the fixed table 20 and then irradiated with an X-ray beam for CT scan, whereby a plurality of projection images (for example, 800 projection images) are obtained.

In the meantime, in step 130, the displacement values of the sensor on the metrology frame 40 during acquisition of the respective projection images are obtained (for example, 800 pieces of data).

In step 140, the initial calibration value, the initial displacement values, and the displacement values of the sensor during the acquisition of the projection images are input as the parameters of the CT reconstruction processing. The CT reconstruction processing is performed on the obtained projection images to generate volume data.

The displacement values of the sensor during the acquisition of the projection images are used in the CT reconstruction processing, whereby high-quality volume data with suppressed effect of changes in geometric position during the CT scan can be generated.

Figure 10:
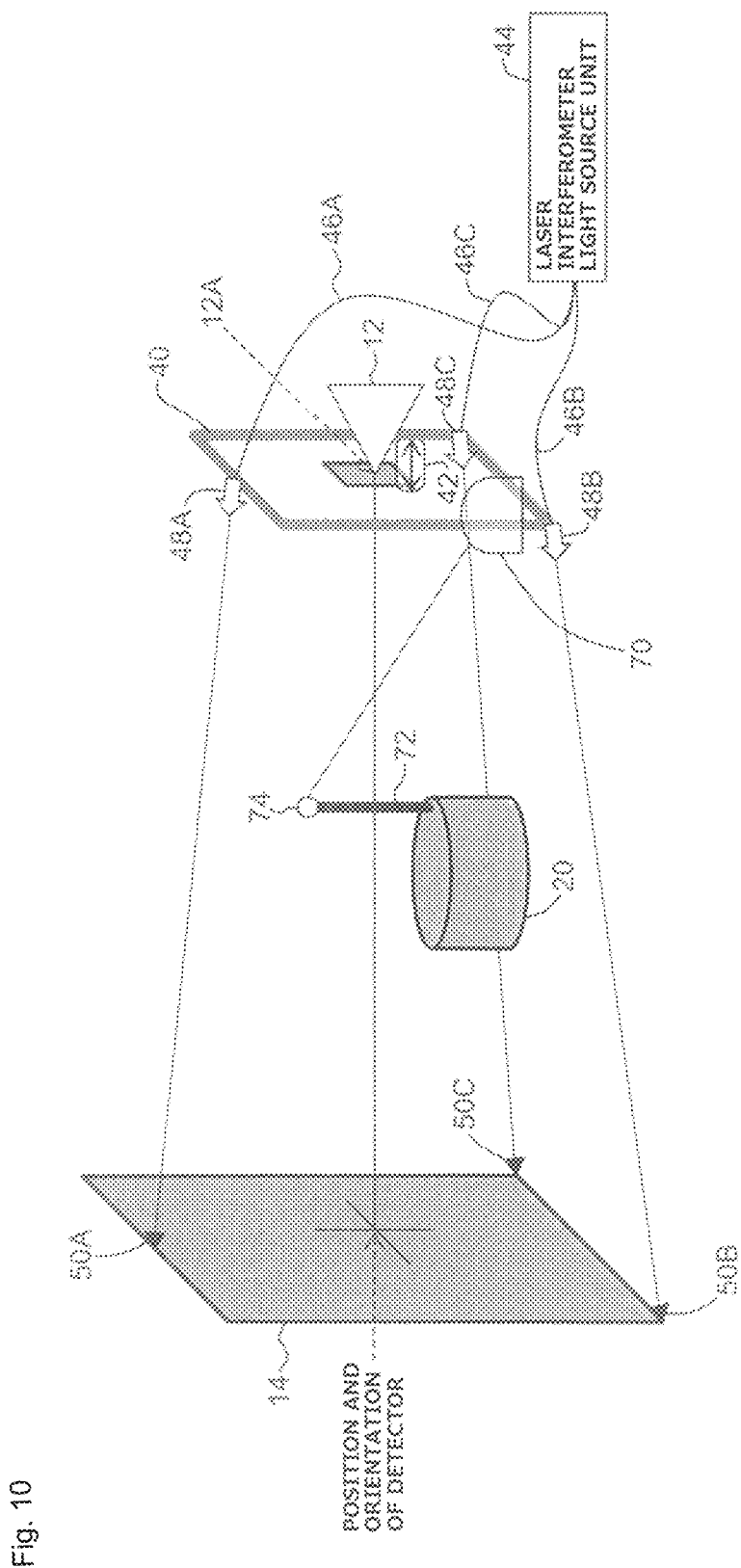
FIG. 10 is a perspective view showing a second embodiment of the present invention.

Next, a second embodiment of the present invention will be described with reference to FIG. 10.

The present embodiment is implemented by modifying the position and eccentricity measurement of the fixed table 20 in the first embodiment so that the measurement is performed by using a laser tracker 70 disposed on the metrology frame 40.

The laser tracker 70 measures the position and eccentricity of the fixed table 20, for example, by using a cat eye reflector 74 disposed on a fixing jig 72.

In other respects, the second embodiment is the same as the first embodiment. A description thereof will thus be omitted.

The foregoing embodiments have dealt with the combination of the metrology frame of square shape and the sensor as an example. However, a combination of a reference frame and a sensor is not limited thereto, and any various combinations can be used according to need.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

The invention claimed is:

1. A dimensional X-ray computed tomography system comprising:
    an X-ray source;
    an X-ray detector;
    a fixed table;
    a reference frame that includes a material and structure less susceptible to an environmental variation;
    a laser interferometer disposed on the reference frame; and a corner cube disposed on the X-ray detector, wherein
the reference frame is disposed where the X-ray source is, and the corner cube is detected by the laser interferometer,
the dimensional X-ray computed tomography system being configured to obtain projection images by irradiating an object to be measured disposed between the X-ray source and the X-ray detector with X-rays for CT scan, and generate a three-dimensional image of the object to be measured by performing CT reconstruction on the projection images,
the object to be measured is placed on the fixed table, and
the X-ray source and the X-ray detector are a movable X-ray source and a movable X-ray detector that are capable of moving around the fixed table with the fixed table therebetween, respectively.

2. The dimensional X-ray computed tomography system according to claim 1, further comprising:
a sensor that is disposed on the reference frame and configured to sequentially detect positions and orientations of the movable X-ray source and the movable X-ray detector during the CT scan; and
a reconstruction unit configured to use the detected positions as parameters of the CT reconstruction.

3. The dimensional X-ray computed tomography system according to claim 2, wherein the reference frame is a metrology frame of square shape.

4. The dimensional X-ray computed tomography system according to claim 1, wherein the laser interferometer is configured to include a light source unit, a light guide fiber, and a laser interferometer emission unit disposed on the reference frame.

5. The dimensional X-ray computed tomography system according to claim 1, further comprising:
a rotary type eccentricity measurement device that is disposed on the fixed table; and
a sensor configured to detect a position of the rotary type eccentricity measurement device, the sensor being disposed on the reference frame.

6. The dimensional X-ray computed tomography system according to claim 5, wherein the sensor for the rotary type eccentricity measurement device is a displacement gauge that is disposed around a reference surface on an outer periphery of the fixed table and has a sensitivity in radial and axial directions.

7. The dimensional X-ray computed tomography system according to claim 1, comprising:
a fixing jig disposed on the fixed table; and a cat eye reflector disposed on the fixing jig, and wherein
the sensor is a laser tracker configured to detect the cat eye reflector disposed on the fixing jig on the fixed table.

8. The dimensional X-ray computed tomography system according to claim 1, wherein any of the X-ray source and the X-ray detector is mounted on any of a vehicle that runs on the ground and a flying object that flies in the air.

9. The dimensional X-ray computed tomography system according to claim 1, wherein any of the X-ray source and the X-ray detector is configured to be manually moved.

10. A CT reconstruction method using a dimensional X-ray computed tomography system, the CT reconstruction method comprising:
calibrating a geometric positional relationship between a focal point of an X-ray source, an X-ray detector, and a fixed table of the dimensional X-ray computed tomography system, and then storing the calibrated geometric positional relationship as an initial calibration value;
obtaining a displacement value of a displacement gauge that is a sensor on a metrology frame and a displacement value of a rotary type eccentricity measurement device, and storing the displacement values as initial displacement values;
disposing a laser interferometer on the metrology frame;
disposing a corner cube on the X-ray detector, wherein the metrology frame is disposed where the X-ray source is, and the corner cube is detected by the laser interferometer;
placing a work on the fixed table, and then irradiating the work with an X-ray beam for CT scan to obtain a plurality of projection images;
obtaining, meanwhile, displacement values of the sensor on the metrology frame during acquisition of the respective projection images; and
inputting the initial calibration value, the initial displacement values, and the displacement values of the sensor during the acquisition of the projection images as parameters of CT reconstruction processing, and performing the CT reconstruction processing on the obtained projection images by using the displacement values of the sensor during the acquisition of the projection images to generate volume data.

* * * * *